United States Patent [19]

Choi

[11] Patent Number: 5,345,278
[45] Date of Patent: Sep. 6, 1994

[54] CONTRAST AND BRIGHTNESS CONTROL FOR TELEVISION RECEIVER WITH TELETEXT

[75] Inventor: Byeong-Yong Choi, Kyungki-do, Rep. of Korea

[73] Assignee: SamSung Electronics Co., Ltd., Kyungki-do, Rep. of Korea

[21] Appl. No.: 937,741

[22] Filed: Sep. 1, 1992

[30] Foreign Application Priority Data

Sep. 16, 1991 [KR] Rep. of Korea ............... 1991-16127

[51] Int. Cl.5 ................... H04N 5/235; H04N 5/57
[52] U.S. Cl. ............................ 348/686; 348/687
[58] Field of Search .............. 358/168, 169, 36, 37, 358/142, 141, 12, 13, 183; 348/687, 686; H04N 5/235, 5/57

[56] References Cited

U.S. PATENT DOCUMENTS

| | | | |
|---|---|---|---|
| 3,946,275 | 3/1976 | Marino | 358/168 |
| 4,218,698 | 8/1980 | Bart | 358/183 |
| 4,644,387 | 2/1987 | Bell | 358/21 R |
| 4,660,084 | 4/1987 | Filliman | 358/168 |
| 4,663,668 | 5/1987 | Rabii | 358/168 |
| 4,965,669 | 10/1990 | Canfield | 358/171 |

*Primary Examiner*—James J. Groody
*Assistant Examiner*—Chris Grant
*Attorney, Agent, or Firm*—Robert E. Bushnell

[57] ABSTRACT

Disclosed is a circuit for commonly controlling the contrast and brightness of both TV and TTX pictures in a TV receiver with TTX. A microcomputer processes the user's key-input for controlling the contrast and brightness of the TV or TTX pictures to generate PWM pulses, which are integrated so as to simultaneously control the contrast and brightness of the TV and TTX pictures, one of which is selectively applied to the CRT driver 7 to drive the display.

5 Claims, 2 Drawing Sheets

CONTRAST AND BRIGHTNESS CONTROL FOR TELEVISION RECEIVER WITH TELETEXT

TECHNICAL BACKGROUND

The present invention relates to a circuit for controlling the contrast and brightness of a picture of a television receiver with a teletext (TTX) board, and more particularly to a circuit for commonly controlling the contrast and brightness of both TV and TTX pictures.

It is well known in this technical field that a TV receiver with a TTX board needs a picture control circuit to control the picture signals according to whether they are TV or TTX signals. The picture control is divided into the contrast and brightness control.

The conventional TV receiver with a TTX board includes two picture control circuits to separately control the contrast and brightness of TV and TTX picture signals. As shown in FIG. 1, a first variable resistor VR1 is to control the contrast of the TTX picture, second variable resistor VR2 the brightness of the TTX picture, third variable resistor VR3 the contrast of the TV picture, and fourth variable resistor VR4 the brightness of the TV picture. Hence, the changing of the picture source from TV to TTX or vice versa always requires additional picture controls. Although a remotely controlled TV receiver employs a microcomputer to process the user's key-input to control the contrast and brightness of the pictures by generating pulse width modulation (PWM) pulses integrated, this may not applied to a TV receiver with TTX.

SUMMARY OF THE INVENTION

The object of the present invention is to provide a circuit for commonly controlling the contrast and brightness of both TV and TTX pictures in a TV receiver with a TTX board.

According to the present invention, a contrast and brightness control for television receiver with TTX comprises a circuit for generating a first and second PWM pulses according to a contrast or brightness control key-input, a circuit for integrating the first PWM pulses so as to generate a first direct current voltage, a circuit for integrating the second PWM pulses so as to generate a second direct current voltage, a circuit for processing the television color signals by changing the level of the reference direct current for the brightness of a TV picture according to the level of the second direct current voltage so as to control the brightness and by changing the magnitude of a TV picture signal according to the level the first direct current so as to control the contrast of the TV picture, and a circuit for controlling the brightness of a TTX picture by changing the level of the reference current for the brightness of the picture according to the level of the second direct current voltage and the contrast of the picture by changing the magnitude of a TTX picture signal according to the level of the first direct current voltage, the TV or TTX signal with the controlled contrast and brightness being selectively switched to a drive circuit for a CRT.

The present invention will now be described more specifically with reference to the drawings attached only by way of example.

BRIEF DESCRIPTION OF THE ATTACHED DRAWINGS

FIG. 1 is a block diagram of a conventional contrast and brightness control of TV/TTX pictures; and FIG. 2 is a block diagram of the inventive contrast and brightness control of TV/TTX pictures.

DETAILED DESCRIPTION OF A CERTAIN PREFERRED EMBODIMENT

Figure 1:
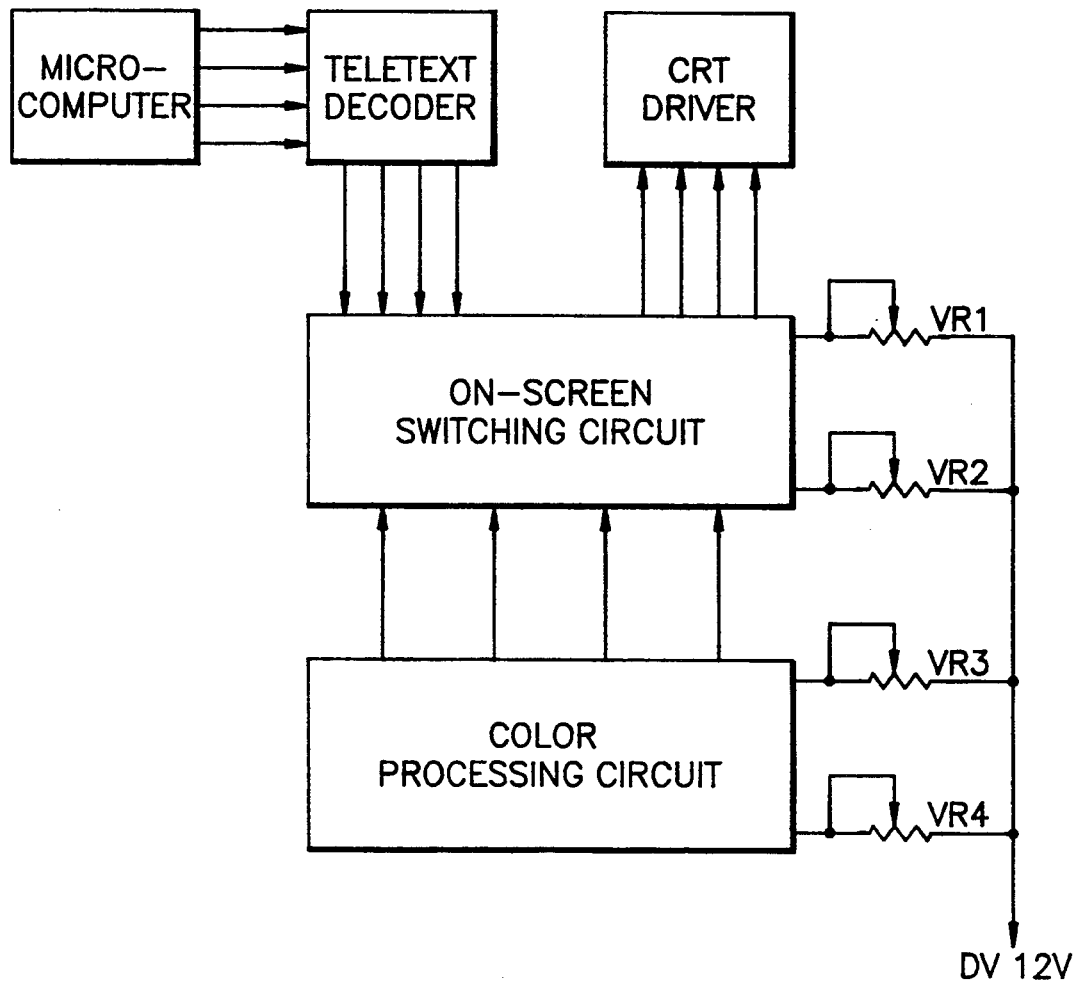
Figure 2:
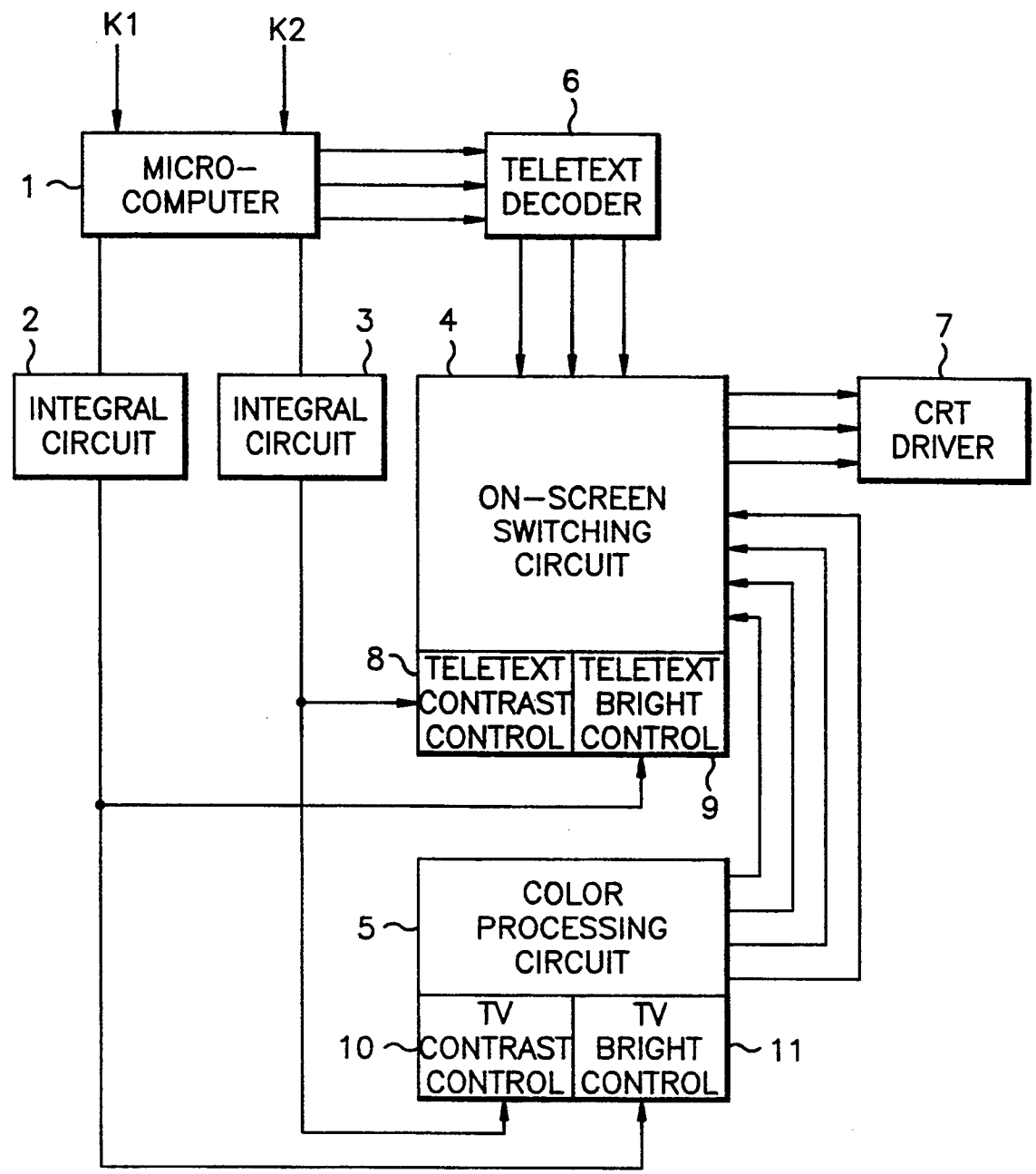

Referring to FIG. 2, a contrast and brightness control of TV and TTX pictures comprises a microcomputer 1, first and second integral circuit 2 and 3, CRT driver 7, on-screen switching circuit 4, color processing circuit 5, and TTX decoder 6.

The microcomputer 1 is to control the whole functions of the TV receiver with the TTX and generates the PWM pulses according to the user's key-input for controlling the contrast or brightness. The first and second integral circuits 2 and 3 are to integrate the PWM pulses to convert into direct currents. The CRT driver 7 is to control the input TV or TTX signals displayed on the CRT.

The on-screen switching circuit 4 comprises a TTX brightness and contrast control circuits 9, 8, which respectively control the brightness and contrast of a TTX picture by changing the level of the reference direct current for the brightness of the TTX picture and the magnitude of the signal in response to the levels of the direct current from the integral circuits 2 and 3. The TV or TTX signal with controlled contrast and brightness is selectively switched to the CRT driver 7.

The color processing circuit 5 comprises TV brightness and contrast control circuits 11, 10, which respectively control the brightness and contrast of a TV picture by changing the level of the reference direct current for the brightness of the TV picture and the magnitude of the signal in response to the levels of the direct current from the integral circuits 2 and 3. The TV signal with controlled contrast and brightness is switched to the on-screen switching circuit 4. The TTX decoder 6 decodes the TTX signal applied the on-screen switching circuit 4 under the control of the microcomputer 1.

In operation, the microcomputer 1 processes the informations k1, k2 for the brightness and contrast of a picture so as to generate PWM pulses. The first and second integral circuits 2 and 3 respectively integrate the PWM pulses for the brightness and contrast to generate a first and second substantially direct current voltage commonly applied to the TV and TTX contrast and brightness control circuits 8–11.

Thus the second direct current voltage is commonly applied to both TV and TTX contrast control circuits 10 and 8, so that the magnitudes of the TV and TTX picture signals are changed to control the contrast according to the level of the second direct current. Likewise the brightness of the TV and TTX pictures may be controlled by changing the level of the reference direct current according to the level of the first direct current.

According to the present invention, the TV and TTX pictures are simultaneously controlled and one of them is selectively applied by the on-screen switching circuit 4 to the CRT driver 7 to drive the display, so that even the changing of the picture source from TV to TTX or vice versa does not require any additional picture control.

What is claimed is:

1. A contrast and brightness control for television receiver with teletext, comprising:

first means for generating first and second pulse width modulation pulses according to one of a contrast and a brightness control key-input;

second means for integrating said first pulse width modulation pulses so as to generate a first direct current voltage;

third means for integrating said second pulse width modulation pulses so as to generate a second direct current voltage;

fourth means for controlling the brightness and contrast of a television picture by changing the level of a reference direct current of a television picture signal according to the level of said second direct current voltage, and by changing the magnitude of said television picture signal according to the level of said first direct current voltage; and fifth means for controlling the brightness and contrast of a teletext picture by changing the level of a reference direct current of a teletext picture signal according to the level of said second direct current voltage, and by changing the magnitude of said teletext picture signal according to the level of said first direct current voltage, whereby the television signal and the teletext signal with controlled brightness and contrast are being selectively switched to a drive circuit for a visual display on a cathode ray tube.

2. A contrast and brightness control circuit for a television receiver with teletext, comprising:

means for generating first and second integrated signals in dependence upon selection by a user to control the brightness and contrast of a teletext picture and a television picture on a visual display;

means for controlling the brightness of the teletext picture on said visual display by adjusting the level of a first reference DC of a teletext picture signal in dependence upon said first integrated signal, and controlling the contrast of the teletext picture on said visual display by adjusting the amplitude of the teletext picture signal in dependence upon said second integrated signal;

means for controlling the brightness of the television picture on said visual display by adjusting the level of a second reference DC of a television picture signal in dependence upon said first integrated signal, and controlling the contrast of the television picture on said visual display by adjusting the amplitude of the television picture signal in dependence upon said second integrated signal; and means for enabling a display of one of the television picture and the teletext picture on said visual display, said television picture and said teletext picture having brightness and contrast controlled respectively in dependence upon said first and second integrated signals.

3. The contrast and brightness control circuit as claimed in claim 2, wherein said first and second integrated signals comprises:

a keypad having a plurality of input keys;

controller means, responsive to input keys representative of contrast control key and brightness control key selected by the user, for generating first and second pulse width modulation signals to control either the brightness or the contrast of the teletext picture and the television picture on the visual display;

first integrating means for integrating said first pulse width modulation signal to provide said first integrated signal; and second integrating means for integrating said second pulse width modulation signal to provide said second integrated signal.

4. A contrast and brightness control circuit for a television receiver with teletext, comprising:

a microcomputer for generating first and second pulse width modulation pulses in dependence upon reception of key input information respectively representative of brightness and contrast control of a teletext picture and a television picture on a display screen;

first and second integrator means for integrating said first and second pulse width modulation pulses to generate first and second integrated signals;

teletext controller means for generating a teletext picture signal representative of the teletext picture having the brightness and contrast controlled by said first and second integrated signals, said teletext controller means generating said teletext picture signal by adjusting the level of a first reference DC of said teletext picture signal in dependence upon said first integrated signal to control the brightness of the teletext picture to be displayed on said display screen, and adjusting the amplitude of the teletext picture signal in dependence upon said second integrated signal to control the contrast of the teletext picture to be displayed on said display screen;

television controller means for generating a television picture signal representative of the television picture having the brightness and contrast controlled by said first and second integrated signals, said television controller means generating said television picture signal by adjusting the level of a second reference DC of said television picture signal in dependence upon said first integrated signal to control the brightness of the television picture to be displayed on said display screen, and adjusting the amplitude of the television picture signal in dependence upon said second integrated signal to control the contrast of the television picture to be displayed on said display screen;

on-screen switch means for enabling transmission of one of the teletext picture signal and the television picture signal; and driver means for driving the transmitted one of the teletext picture signal and the television picture signal to enable a visual display of said transmitted one of the television picture and the teletext picture on said display screen via a cathode ray tube.

5. A method for controlling contrast and brightness of a picture for a television receiver with teletext, comprising the steps of:

generating first and second integrated signals in dependence upon selection by a user to individually control the brightness and contrast of a teletext picture and a television picture on a visual display;

adjusting the level of a first reference DC of a teletext picture signal in dependence upon said first integrated signal to control the brightness of the teletext picture on said visual display;

adjusting the amplitude of the teletext picture signal in dependence upon said second integrated signal to control the contrast of the teletext picture on said visual display;

adjusting the level of a second reference DC of a television picture signal in dependence upon said first integrated signal to control the brightness of the television picture on said visual display;

adjusting the amplitude of the television picture signal in dependence upon said second integrated signal to control the contrast of the television picture on said visual display; and enabling a display of one of the television picture and the teletext picture on said visual display, said television picture and said teletext picture having the brightness and contrast adjusted respectively in dependence upon said first and second integrated signals.

* * * * *